United States Patent [19]

Traylor

[11] Patent Number: 4,469,131
[45] Date of Patent: Sep. 4, 1984

[54] SPOOL VALVE

[76] Inventor: Paul L. Traylor, 16591 Milliken Ave., Irvine, Calif. 92714

[21] Appl. No.: 397,414

[22] Filed: Jul. 12, 1982

[51] Int. Cl.³ .............................................. F16K 11/18
[52] U.S. Cl. ............................. 137/599.1; 137/625.29; 137/627.5
[58] Field of Search ............. 137/599.1, 625.29, 627.5; 210/420, 424–427

[56] References Cited

U.S. PATENT DOCUMENTS

| | | | |
|---|---|---|---|
| 306,880 | 10/1884 | Wallace | 137/599.1 |
| 2,553,458 | 5/1951 | Jordan | 137/625.29 |
| 2,921,687 | 1/1960 | Jenkins | 137/599.1 |
| 3,272,241 | 9/1966 | Wagner | 137/599.1 X |
| 4,130,133 | 12/1978 | Sullivan | 137/599.1 |
| 4,250,920 | 2/1981 | Traylor | 137/625.29 |

Primary Examiner—Robert G. Nilson
Attorney, Agent, or Firm—Fulwider, Patton, Rieber, Lee & Utecht

[57] ABSTRACT

A spool valve composite valve stem mounting a pair of valve heads longitudinally movable to a service position in which the valve heads cooperate with valve seats to direct fluid along one path, the valve stem being oppositely movable to a backwash position in which a first one of the valve heads is seated and the other is not, thereby directing fluid along a second path. The two piece, composite valve stem, in combination with other constructional features of the valve, enables the first valve head to remain seated while moving the second valve head to a seated position to establish a bypass position for directing fluid along a third path. Various means are shown for coupling together the valve stem portions and for axially moving the stem portions back and forth. Embodiments for use with water treatment equipment and water heating are disclosed.

30 Claims, 9 Drawing Figures

SPOOL VALVE

BACKGROUND OF THE INVENTION

1. Field of the Invention

The present invention relates to a spool valve for controlling fluid flow, and particularly to a valve which is readily convertible to provide a variety of fluid flow modes.

2. Description of the Prior Art

Although the present invention has utility in connection with other fluid handling applications, it has particular relevance to water softeners having tanks containing material through which hard water is passed for softening. It is often desirable to bypass the tank, such as when the softener must be repaired or when the user will be absent for an extended period of time. The bypass valve used to do this is also commonly used in non-automatic types of water softeners to enable periodic replacement of the tank with one having a fresh charge of softener material.

It is desirable in many instances to provide a backwash function in addition to the service and bypass functions of a typical bypass valve. During backwashing, water is directed through the water softener equipment in a reverse direction to agitate, flush out, or carry off impurities and other foreign materials which have collected in the system. Generally these impurities will have collected at or near the top of the conditioner tank as a result of normal water flow direction and as a result of the normal softening or filtering process. A suitable backwash valve provides a path for the trapped impurities to be flushed down a drain.

My U.S. Pat. No. 4,250,920 entitled "Valve for Water Treatment Equipment", and issued Feb. 17, 1981, discloses a valve operative to perform the service, bypass and backwash functions just described. Although the valve generally operates satisfactorily, there are a number of areas in which improvements are desirable. For example, the valve is complicated by the provision of a rotatable bonnet to achieve the backwash function. In addition, the valve employs a fixed or integral post to threadably receive a one-piece valve stem. Such a threaded post involves extra production cost, and the one-piece nature of the valve stem necessarily requires a longer and somewhat larger valve body. Also, this design requires that at least one of the sealing spools be rotatable on the shaft and be sealed around the shaft. This complicates manufacture and valve assembly and disassembly. Also, maintenance or repair of the valve requires complete removal of the valve stem in order to replace the spools or associated seats. Several features of the design also raise the cost of production. Further, ease of movement of the bonnet into and out of the backwash position varies as the internal valve pressure varies. As pressure increases the bonnet becomes more difficult to move. Finally, the sequence of operation began from a service mode, then to a bypass mode and finally to a backwash mode. However, the sequence usually desired is between service and backwash modes, with only an occasionaal movement of the valve to the bypass mode. In some instances only service and backwash modes are of interest.

SUMMARY OF THE INVENTION

According to the present invention, a valve is provided which is adapted for use with various kinds of fluid handling equipment, the term fluid being used to include both liquids and gases. It is particularly useful with water treatment equipment and is characterized by long and reliable service life, ease of manufacture, and simplicity and flexibility of operation. It includes a casing having an elongated chamber divided into sections or chambers having various ports, including a supply port, a distribution port, a treatment inlet port, and a treatment outlet port. The chambers are interconnected by passages having longitudinally aligned valve seats which are opened and closed by valve heads moveable with a longitudinally moveable valve stem and characterized by confronting seals or gaskets.

In one embodiment the valve stem is rotatably, threadably moveable to a service position in which the gaskets of a pair of valve heads engage a pair of valve seats to direct fluid from the supply port to the treatment inlet port, and from the treatment outlet port to the distribution port. The valve heads and valve seats are preferably arranged such that threaded movement of the valve stem away from the service position effects seating of only one of the valve heads to establish a backwash position. In certain embodiments of the valve, fluid flows out through a suitable drain port.

The valve stem is of two piece construction, including relatively, axially movable stem portions, in one embodiment the seated valve head mounting a material which is compressible upon movement of the valve stem beyond the backwash position. The seated valve head remains seated, and the second valve head continues to move until it is seated, this continued movement being enabled by the two piece valve stem construction and the compressibility of the valve head material. The seating of the second valve head establishes the bypass position. Thus, in this configuration, the valve provides three modes of operation, service, backwash and bypass.

If desired, each mating set of the valve heads and valve seats can be made to engage simultaneously, in which case the valve would be a two mode valve, that is, service and bypass modes, and the drain port could be eliminated, or closed off if it forms an integral part of the valve body.

The establishment of service, backwash, and bypass modes, in that sequence, is what is normally desired in most water treatment applications, the water treatment equipment being normally operated between the service and backwash modes with only occasional use of the bypass mode.

It is usually desirable to provide an immediate maximum backwash flow rate under the control of a suitable flow control restriction in the valve, which is characteristic of the present valve, further advancement of the valve spool throttling down the backwash flow until finally it is shut off to establish the bypass mode of the valve.

The present spool valve does not require any internal or integral casing posts to support the valve stem, although it could incorporate such posts if desired.

The two valve stem portions are preferably but not necessarily threadably mounted at their ends to separate end caps for rotation in common. The stem portions are axially separable for easy assembly and disassembly, and for access to either end of the valve casing and to the valve spools and seats.

The two valve stem portions may be provided with different thread pitches so that rotation in common effects differential rates of movement of the two valve heads. Such an arrangement is useful in adjusting the interval between seating of one valve head versus the other, which is important during movement of the valve heads between two positions such as backwash bypass, for example.

Other objects and features of the invention will become apparent from consideration of the following description taken in connection with the accompanying drawings.

DESCRIPTION OF THE PREFERRED EMBODIMENTS

Referring now to the drawings, and particularly to FIGS. 1-5, there is illustrated a spool valve 10 for use with equipment (not shown) for water softening, conditioning, filtering or other treatment. Other than its usual service mode, it can be used in a backwash mode to backwash water softeners, filters in water treatment plants, and filters in commercial establishments, swimming pools and the like. It can also be used to bypass such equipment, as might be necessary when the equipment is to be repaired, or where the softener tank of a non-automatic softener must be replaced.

As will be seen, the valve 10 is constructed in such a way that very little internal change is required to enable the valve to perform these modes of operation, as well as a bypass modes and also specialized functions in connection with solar heating panels and associated equipment. It is capable of adjustment of rates of flow in all of its various modes of operation.

A preferred embodiment of the valve employs a basic combination of valve body or housing, internal valve heads and seats, and a pair of end connected stem portions mounting the valve heads. This basic combination, as will be seen, can easily be modified or re-arranged to provide service and bypass modes, service and backwash modes, or service, backwash and bypass modes, as desired. Also, as previously indicated, the washer material can be made thicker on one spool to cause it to seat in advance of the seating of the other spool to thereby establish a backwash mode, for example, or the same result can be achieved by adjusting the distance of travel of the spools. More particularly, the distance one spool must travel prior to seating can be modified by providing a shorter distance within the valve body for its travel, or by biasing it so that its starting point is in advance of the starting point of the other spool. Another alternative is provision of different thread pitches on the two stem portions so that the portion with fewer threads per inch can moves at a faster rate and engages its valve seat before the other stem portion. Yet another alternative would be to omit threads on the driven stem portion and axially slidably mount it to the other stem portion so that a spring could be used to bias the axially slidable stem portion to a seated position before the other stem portion. Various ones of these embodiments will subsequently be described.

In connection with the description which follows, it is also noted that the means which accomplishes seating of the valve head of the driven valve stem in its leftmost position, for example, prior to seating of the other valve head can be accomplished in a variety of ways, and the invention is not to be limited to the means herein specified. Moreover, the degree of seating of one valve head in advance of the other can be varied according to the needs of the particular application, one application where this is important being adjustment of the rate of fluid flow in a backwash position.

With respect to the embodiment of FIGS. 1-6, the valve 10 is normally operable between a service position and a backwash position. However, it can also be operated beyond the backwash position to provide a bypass function, as will be seen. In addition, as will be explained in conjunction with FIG. 7, if only bypass/service mode operation is needed, the construction of the valve 10 can be simplified somewhat by eliminating parts used only for a backwash operation.

Figure 1:
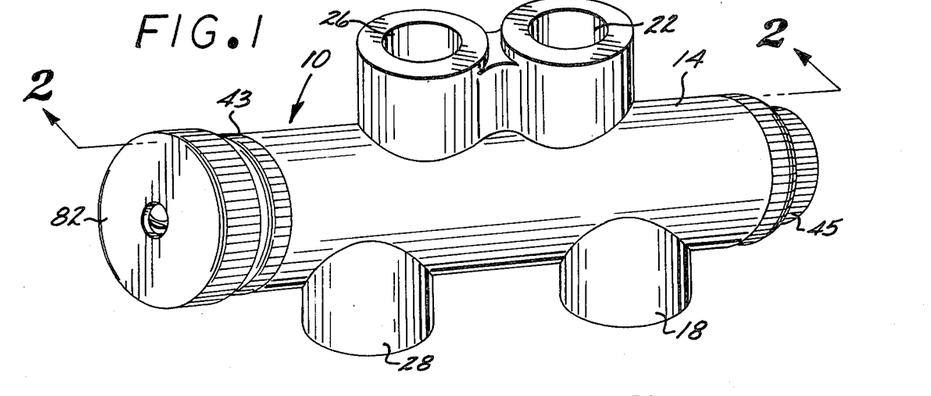
FIG. 1 is a perspective view of a spool valve according to the present invention.

The embodiment of FIG. 1 provides service, backwash and bypass functions, depending upon the position of the two valve stem portions and the valve heads which they mount and, as will be seen, is thereby adapted to suit a wide variety of applications.

The valve 10 comprises, generally, an elongated cylindrical valve body or casing 14 divided into a plurality of separate chambers, including a chamber 16 having a treatment inlet port 18, a chamber 20 having a supply port 22, and a chamber 24 having a distribution port 26 and a treatment outlet port 28.

The valve casing 14 is preferably made of cast brass or similar material althrough, like many other components of the spool valve 10, it would also be made of molded plastic or any other suitable material capable of withstanding usual water main pressures.

Figure 8:
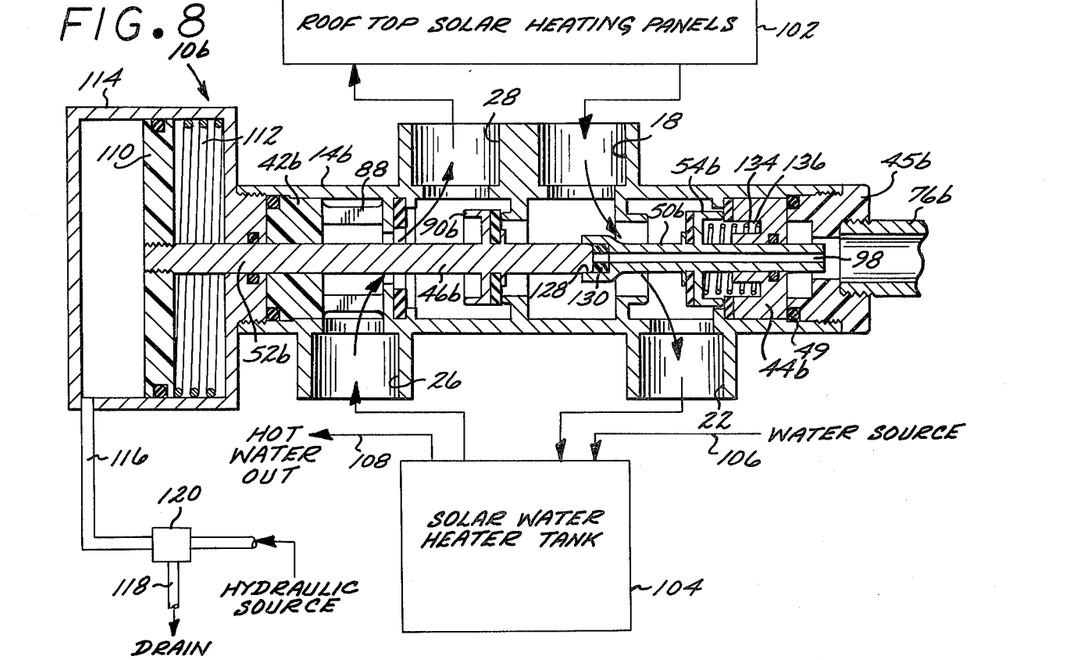
FIG. 8 is a view of a third embodiment of the present valve, illustrating a solar heating application, with the valve in its service position.
Figure 9:
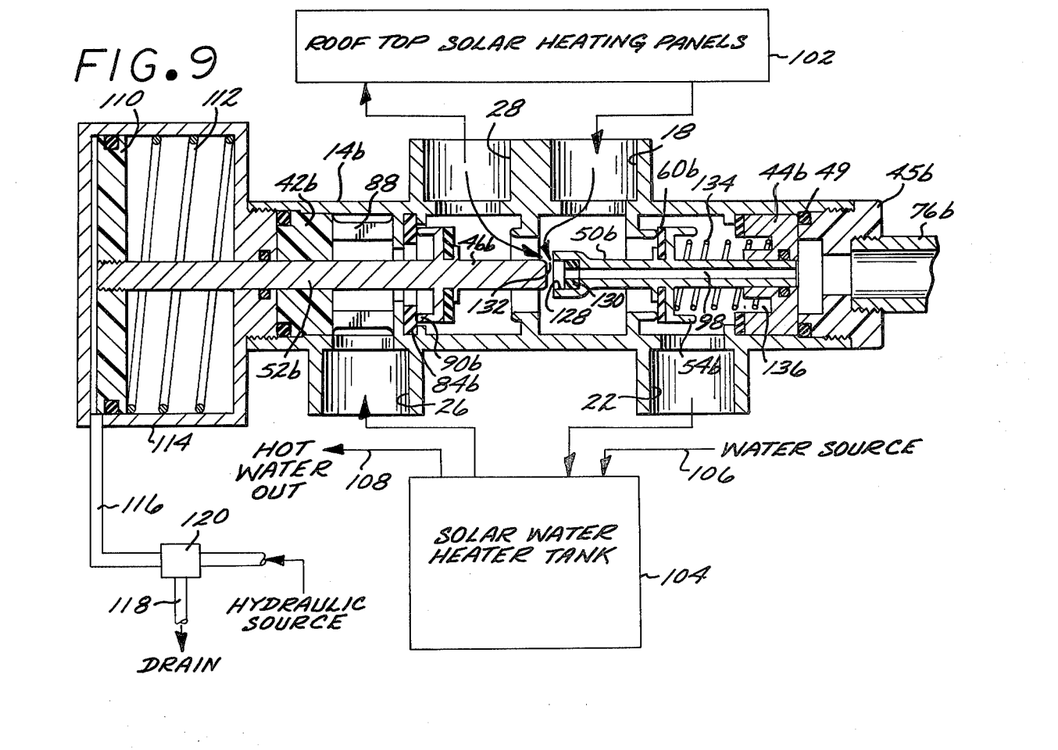
FIG. 9 is a view similar to FIG. 8, but illustrating the valve in the "bleed-down" position of the solar heating system.

The treatment inlet port 18 and treatment outlet port 28 are adapted for connection to water treatment equipment. The supply port 22 is adapted for connection to a house water supply, and the distribution port 26 is adapted to be connected to the plumbing network in a household. Although the present disclosure is directed to use in connection with a household water softener system, a wide variety of other applications for the valve 10 are possible, one of which is illustrated in FIGS. 8 and 9.

The separate chambers 16 and 20 are defined by a transverse partition or wall 30 which includes a passage 32 located between the chambers 16 and 20 and surrounded by a circumferential valve seat 34. In addition, a transverse partition 36 defines a passage 38 between the chambers 20 and 24, the passage 38 being surrounded by a valve seat 40.

A cylindrical nut bonnet 42 is disposed in the left extremity of the casing 14, and a left end cap 43 is threaded into the left end of the casing 14, bearing up against the bonnet 42 to properly locate it in a predetermined axial position. An O-ring type of seal 41 is interposed between the bonnet 42 and end cap 43 to provide a fluid tight seal at the juncture between the bonnet 42, end cap 43 and adjacent interior wall of the casing 14. In addition, it is important to prevent the bonnet 42 from rotating since, as will be seen, one of the valve stem portions is threaded through it. This is accomplished by tightening the end cap 43 to compress the O-ring seal 41 within its seat and against the valve casing wall, the bonnet 42 being prevented from inward movement by virtue of a circumferential flange 39 thereof engaging a reduced diameter portion of the adjacent casing interior wall. The frictional constraint of the seal 41 prevents rotation of bonnet 42 without resort to the added complication of pins or the like (not shown) interconnecting the bonnet and the casing.

A cylindrical nut or bonnet 44 similar to the bonnet 42 is disposed within the right extremity of the casing 14, and a right end cap 45 is threaded into the right end of the casing 14 into abutment with a cylindrical flange 47 of the bonnet 44. An O-ring type seal 49 is located at the juncture between the bonnet 44, end cap 45 and adjacent wall of the valve casing 14 to provide a fluid tight relationship at this juncture. It also functions precisely like the seal 41 to constrain the bonnet 44 against rotation. Also gasket 56 and gasket 84 operate against bonnet 44 and bonnet 42, respectively, to provide a sealing surface and they also assist in preventing rotation of the bonnets.

Figure 5:
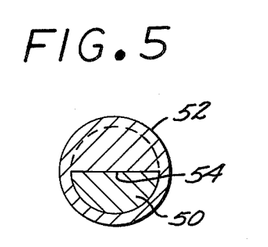
FIG. 5 is a view taken along the line 5—5 of FIG. 4.

An elongated two piece valve rod or stem 46 extends through the valve casing 14 and comprises two axially aligned, end connected valve stem portions 50 and 52. The interconnection of the adjacent ends of the stem portions 50 and 52 is best illustrated in FIG. 5.

The end of the driver stem portion 52 is of larger cross section and is cut away to define a stepped recess 53 adapted to axially receive the smaller cross section end of the driven stem portion 50. With this arrangement the stem portions 50 and 52 are longitudinally or axially moveable relative to one another, but are rotatable in common. In addition, the stem portions 50 and 52 mutually support and axially align one another. It would be equally easy to reverse the coupling end configurations of the valve portions 50 and 52, if desired. Other torque transmitting end connections known to those skilled in the art may be utilized if desired.

Also, if desired, an internal wall could be integrally molded as part of the valve casing to support the stem portions adjacent their juncture.

The stem portion 50 is externally threaded and is disposed through the chamber 16 for threaded engagement with the internal threads of a central opening in the bonnet 44.

A unique form of seal is provided between the exterior of the stem portion 52 and the adjacent bore of the left end cap 43. Instead of providing annular grooves in the bore, which is a relatively expensive additional operation required after molding of the end cap 43, the cap 43 is provided with a first counterbore, which receives an O-ring 55, and a larger counterbore, which receives a washer or spacer 57 and a larger O-ring 59. This arrangement enables the counterbores to be molded in at the time of molding of the end cap 43 and eliminates any need for subsequent machinery of O-ring grooves. In addition, the vertical faces against which the O-rings are pressed are very precisely dimentionally controllable for optimum sealing. O-ring 55 is compressed between the spacer 57 and the base of the first counterbore, but with the degree of compression controlled by engagement of the spacer 57 with the base of the second counterbore. Likewise, the compression of the larger O-ring 59 between the spacer 57 and a sealing washer 78 seated in still larger third counterbore provided in the end cap 43 is controlled by engagement of the washer 78 with the base of the third counterbore. This precise control over the degree of compressing of the O-rings 55 and 59 provides better sealing compared to the usual generous clearances existing between O-rings and the sides of the O-ring grooves within which they are seated. It should be noted that washer 78 could be eliminated and the valve designed such that bonnet 42 holds O-ring 59 in place. Also, two O-rings and spacers are shown here to provide double seal. However, if desired, only one O-ring 55 could be used and ports 57, 59 and 78 eliminated.

The stem portion 50 mounts an integral cylindrical valve head 54 having an axially directed skirt which, on movement of stem portion 50 to the right, engages an annular resilient valve seat 56 which is captured between the bonnet 44 and an inwardly directed flange 58 integral with the valve casing 14. The valve seat 56 is pre-loaded or put under initial compression between the flange 58 and the bonnet 44 by tightening of the right end cap 45 against the O-ring seal 49 and the bonnet 44. This enhances the precise sealing of the valve head skirt against the seat 56.

The opposite face of the valve head 54 includes a rotatable gasket 60 retained in position by a circumferential, outwardly directed flange 62 integral with the body of the stem portion 50. On rotatable, threaded movement of stem portion 50 to the left, the gasket 60 is rotatably engageable with the valve seat 34. Further movement of the stem portion 50 to the left compresses the gasket 60, while yet maintaining a seated relation with the seat 34.

The bonnet 44 is characterized by a plurality of axially extending drain passages 64 which provide communication between the chamber 16 and a chamber 66 defined between the bonnet 44 and the adjacent right end cap 45. A substitute or supplemental communication can be provided between the chambers 16 and 66 by providing a very generous clearance between the threads of stem portion 50 and the threads of the central opening in the bonnet 44, as indicated generally at 63. Another way to provide suitable drain passages would be to axially groove the stem portion 50 (not shown), as will be apparent.

A cylindrical retainer skirt 68 having a central drain passage 70 is disposed within a counter bore in the end cap 45. In addition, an annular fluid flow regulating wafer 72 is located adjacent the retainer skirt 68, the flow wafer being any suitable predetermined size so as to allow a predetermined rate of fluid flow through the drain opening. In addition to variation by virtue of the degree of rotation of the knob 82, the rate of backwash flow can also be varied simply by replacing the wafer 72 with a different wafer having a different size central opening.

The retainer skirt 68 is retained in position by a washer 74 which is forced against the skirt by a drain pipe 76. However, the washer 74 and even the skirt 68 could be eliminated in alternate designs. For example, the flow control washer 72 could be installed adjacent to cavity 66 and entrapped within end cap 45.

The opposite stem portion 52 extends through a central opening of the left end cap 43, as previously indicated, and is externally threaded over a short portion of its length to threadably engage the internal threads of a central opening in the bonnet 42. The sealing washer and O-rings 55 and 59 provide a fluid tight relationship, as described above.

The threads of the bonnets 42 and 44 are of the same pitch so that rotation of a knob 82 on the end of stem portion 52 axially moves stem portions 50 and 52 in unison. Although rotation of the knob 82 is a manual operation, it is entirely within the scope of the invention to substitute a suitable automatic means or suitable driver for either rotating the valve stem 46, or for causing a sliding axial movement, as depicted in FIGS. 8 and 9.

The right extremity of the bonnet 42 mounts a valve seat 84 which is located adjacent an interiorly directed, circumferential flange 86 which is integral with the valve casing 14. The valve seat 84 is, like the valve seat 56, preloaded or placed under compression by tightening of the left end cap 43 against the bonnet 42. This enhances the precise sealing of the adjacent valve head skirt against the valve seat 84, and also helps to prevent rotation of bonnet 42.

The bonnet 42 is partially cut away or removed between the valve seat 84 and the interiorly threaded portion of the bonnet 42 to provide circumferentially, equally spaced integral webs 88 with intervening water passages. These provide communication between the opposite sides of the valve seat 84 in the open position of the adjacent valve head 90.

The valve head 90, like the valve head 54, is integral with the associated stem portion 52 and includes on its left face an axially directed, circumferential flange or skirt engageable with the valve seat 84. On its opposite face the valve head 90 mounts a rotatable gasket 92 which is retained in position by a circumferentially outwardly directed flange 94 integral with the stem portion 52. As will subsequently be described in connection with FIG. 2, rotatable threaded movement of the valve stem 46 to the right effects rotatable engagement between the gasket 92 and the valve seat 40.

Figure 2:
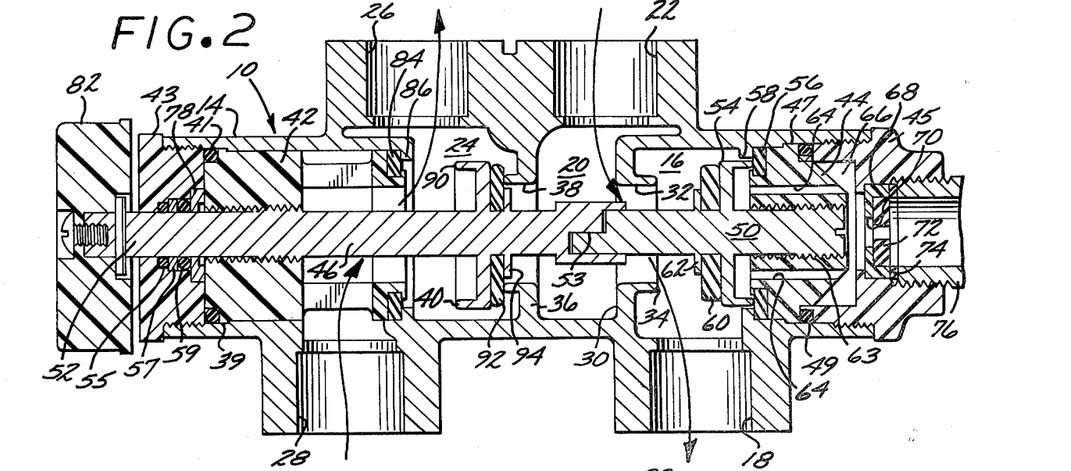
FIG. 2 is a longitudinal cross-sectional view of the valve of FIG. 1 in its service position.

The spool valve 10 thus far described can be operated in a service position, a backwash position, and in a bypass position. Assuming the valve is to be used in a typical application, such as in association with a water filter, the handle or knob 82 is rotated clockwise to urge the valve stem 46 to the right, as seen in FIG. 2. This effects engagement between the valve head 54 and the valve seat 56, and between the valve 90 and the valve seat 40. Water is directed from the supply port 22 to the treatment inlet port 18 for passage into the water treatment equipment. Water from the equipment outlet port 28 is directed by the valve 10 to the distribution port 26 for use of the treated water by a householder.

Figure 3:
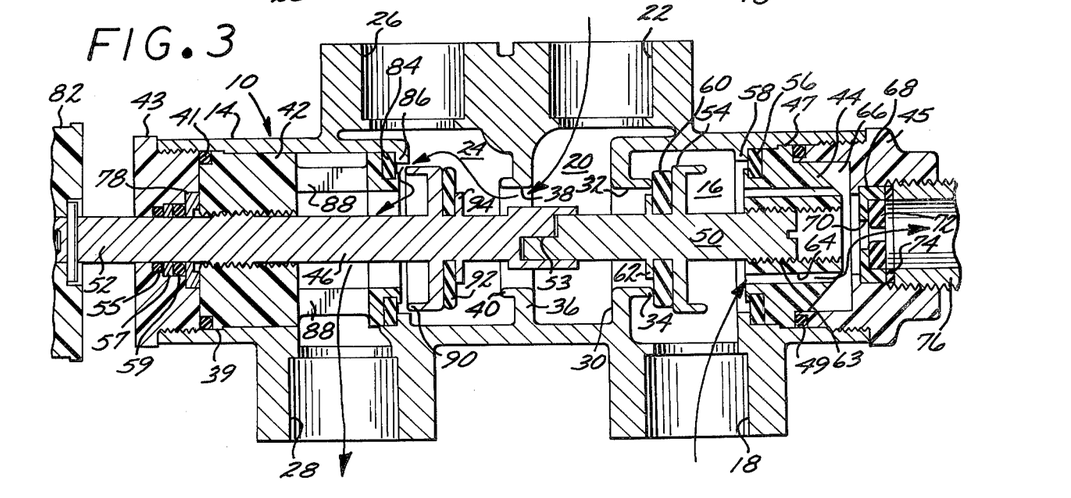
FIG. 3 is a view similar to FIG. 2 illustrating the valve in its backwash position.

By rotating the knob 82 in the opposite direction, which would be counterclockwise by virtue of the right hand thread employed in this embodiment, the stem 46 is moved longitudinally to the left to a backwash position, as seen in FIG. 3. The valve head 54 is engaged with the valve seat 34 but, although the valve seat 92 is disengaged from the valve seat 40, valve head 90 does not quite engage the valve seat 84. Instead, a passage is provided between the valve head 90 and the valve seat 84. In the embodiment illustrated, a gap of approximately 1/16" is provided which generally allows sufficient backwash water to pass from the supply port 22, into the chamber 20, through the passage 38, into the chamber 24, past the valve head 90, and into the treatment outlet port 28. The backwash effluent is allowed to pass from the treatment inlet port 18, past the unseated valve head 54, and out of the drain opening 70 via the passageway 64. Other conduits could be provided in lieu of passageway 64 if desired, such as by slotting the right end of stem portion 50.

Figure 4:
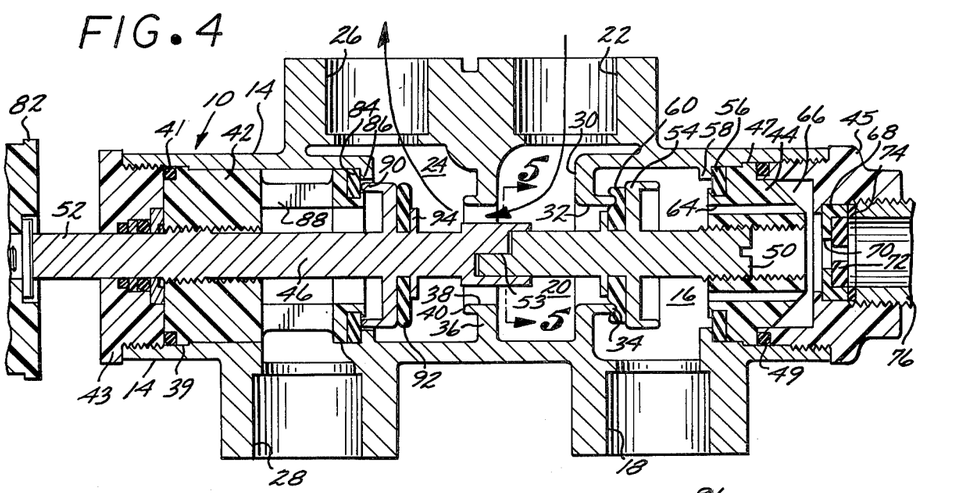
FIG. 4 is a view similar to FIG. 2 illustrating the valve in its bypass position.

To achieve a bypass mode, as seen in FIG. 4, counterclockwise rotation of knob 82 is continued to further move the valve stems 46 and 50 to the left. This seats the valve head 90 upon the valve seat 84, valve head 54 remaining seated upon the valve seat 34 by virtue of compression of the valve head gasket 60. Water can now pass from the supply port 22 into the chamber 20, through the passage 38, into the chamber 24, and then to the distribution port 26.

The delayed or later seating of the valve head 90 relative to the valve head 54 can be achieved in a number of ways: varying the spacings provided between the valve heads and their seats, as by adjusting the axial positions of the valve stem portions 50 and 52 relative to their respective bonnets 44 and 42; varying the thickness and/or hardness of any of the gaskets, as by making the compressible gasket 60 thicker than the gasket 92; or by varying the threaded pitches on the threads for the separate valve stem portions. In the embodiment illustrated, use of the compressible gasket 60 together with appropriate valve head spacing makes the three modes of operation possible in a simple, reliable and economical manner.

A significant feature of the valve 10 is the orientation and manner of entrapment of the gaskets 92 and 60. In their unseated positions they are arranged in confronting relation, facing inwardly toward the adjacent chambers 24 and 16. In these positions water flow during any of the service, backwash, or bypass modes acts upon the gaskets 92 and 60 in a manner generally tending to press them against their associated valve heads 90 and 54, thereby avoiding undesirable peeling back or separation of the gaskets from their valve heads, and the attendant wear, water hammer and the like which this would cause.

Figure 6:
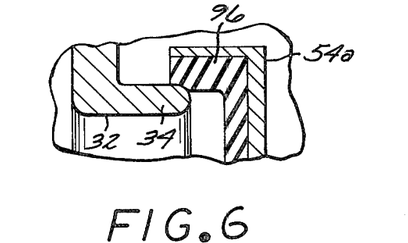
FIG. 6 is a detail cross-sectional view of an alternative arrangement of valve head and valve seat for enabling movement of the valve stem from its backwash to its bypass position.

FIG. 6 illustrates one of several alternative arrangements which permits engagement first of valve head 54a with the valve seat 34. This engagement permits sealing while not unduly constraining still further travel to the leftmost or "by-pass" valve position. In this instance a valve head 54a is provided which includes a gasket 96 having an annular skirt with an internal diameter slightly less than the diameter of the adjacent surface of the flange of the valve seat 34. With this arrangement, the skirt of the gasket 96 progressively slides or telescopes over the axially projecting skirt of the valve seat 34 to maintain the seated relationship, while yet allowing the desired relative axial movement.

Figure 7:
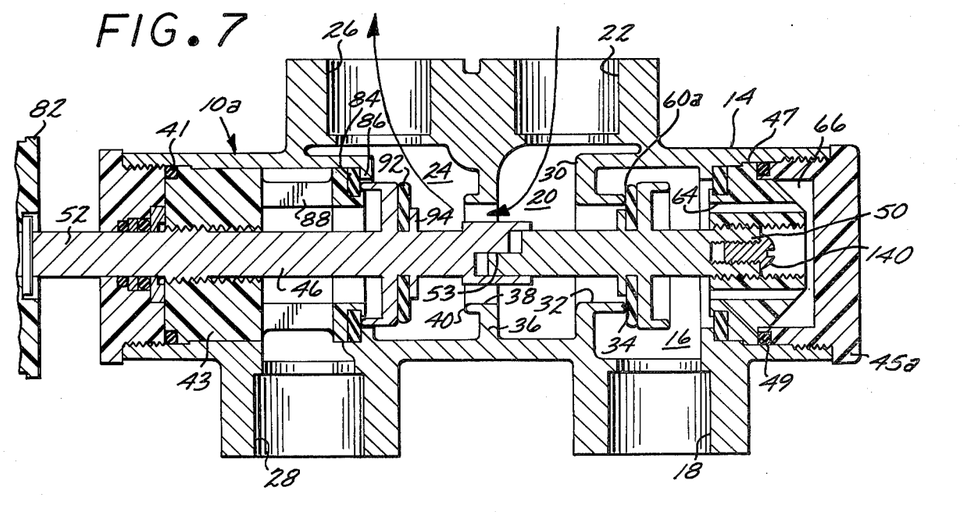
FIG. 7 is a longitudinal cross-sectional view of a second embodiment of the valve, illustrating modification of the valve of FIGS. 1-5 to provide only service and bypass modes.

Referring now to FIG. 7, there is illustrated a simplified version of the previously described spool valve 10. Letter subscripts are used where the parts are similar to those of the first embodiment.

In the spool valve 10a, a modified right end cap 45a is utilized which does not include any central opening or passage for backwash or drain water. Further, a gasket 60a is utilized of the same thickness as the gasket 92 so that both gaskets seat upon their respective valve seats 34 and 84 at the same time. This eliminates the backwash mode of operation, the valve 10a thus serving as a two position or service mode-bypass mode valve. The embodiment of FIG. 7 thus illustrates the ease with which the valve can be modified to suit other needs.

In addition, in many by-pass applications, particularly in European countries, it is desirable to bleed or allow a portion of the untreated or hard incoming water to pass through passageway 38 for mixing with the treated water entering chamber 24 by means of conduit 28. This provides to the user water that is not completely softened or treated.

The valve 10a permits this to be done with precise control over the amount or percentage of bleed-over or untreated water simply by turning the handle 82 counterclockwise to a position corresponding to the bleed-over desired. Unlike many valves on the market, the valve stem of the present valve remains in the set position until it is deliberately repositioned by the user. FIG. 7 illustrates a means by which the amount of bleed-over can be controlled, not by observing the rotated position of the handle 82, but by rotating the handle 82 until a stop means is engaged to prevent further movement.

Various stop means will suggest themselves to those skilled in the art, the stop means in FIG. 7 taking the form of an externally threaded adjustment screw 140 having a rounded, slotted head to facilitate precise axial positioning of the screw 140 in a threaded bore provided in the right end of the valve stem portion 50. The screw thread can be slightly deformed so as to require significant torque to rotate the screw 140. In this way the screw 140 will remain in any adjusted position. The rounded screw head will abut against the adjacent interior face of the right end cap 45a. This fixes the position of the valve stem 46 so that the quantity of the bleed-over untreated water is precisely controlled. Of course, the amount of bleed-over can be increased, if desired, simply by operating the handle 82 to move the valve stem portion 52 to the left.

Other versions of the valve 10 are suited for uses other than water treatment. For example, FIGS. 8 and 9 illustrate an application of a valve 10b for use with a solar heating system.

The valve 10b includes a two piece valve stem 46b comprising stem portions 52b and 50b which are adapted to interengage at their adjacent extremities. In addition, stem portion 50b includes a central, longitudinally extending drain passage 98 in communication with a central opening in a right end cap 45b, which threadably receives a drain pipe 76b.

The left end of stem portion 50b is enlarged and is provided with a central recess 128 having an internal diameter approximating the external diameter of the other stem portion 52b. In addition, a centrally apertured gasket 130 is press fitted within the recess 128 for engagement by the end of the stem portion 52b, such engagement serving to close off and seal the central opening in the gasket 130 so that fluid flow cannot take place through the drain passage 98.

As will be seen, in movement of the valve stem 46b to the left, the gasket 60b of the valve head 54b seats prior to the seating of the valve head 90b against the valve seat 84. This permits an escape path at 132 for water to flow into the drain passage 98.

A compression spring 134 is seated at one extremity within an annular recess 135 in the bonnet 44b, and at its opposite extremity engages the valve head 54b, biasing it to the left, as seen in FIG. 9.

The output from solar heating panels 102 is connected to port 18, and the input to the solar heating panels 102 is connected to port 28.

The port 22 is connected to a solar water heater tank 104, and the output from the tank 104 is connected to port 26. In addition, water from a water source passes into the tank 104 through a conduit 106, and hot water from the tank 104 which has been heated by the panels 102 and/or the tank 104 can be drawn off through a conduit 108.

Instead of using a rotatable valve stem 46 and an associated knob 82 as in the first embodiment, the valve stem 46b is axially or longitudinally slidably movable by a hydraulically actuated piston 110 acting against the bias of the spring 134 and also against the bias of a compression spring 112 located within a cylinder 114 which is mounted at the left end of the valve 10b, as best seen in FIG. 8.

The piston 110 is selectively movable to move the valve stem 46b to the right by connection of the piston cylinder 114 to a suitable hydraulic source by means of a conduit 116. Fluid flow is directed to the cylinder 114 or to a drain by means of a conduit 118, according to the operation of a suitable control means, generally indicated at 120. The control means are operative in one state to cause water to be directed to the cylinder 114 and isolated from the drain. In another control state, water under pressure is isolated from the cylinder 114, but is allowed to drain from the cylinder 114 through the conduits 116 and 118, thereby enabling the springs to move piston 110 to the left position, as best depicted in FIG. 9. This position would permit "drain down" of the solar panels to prevent freezing and damage to the system in cold weather.

In operation, movement of the valve stem portion 52b to the right by pressurization of the cylinder 114 unseats the valve heads 90b and 54b to establish a service mode in which water passes from the water source, through the conduit 106, through the tank 104, through port 26, past the valve stem 52b, through the port 28, and to the solar heating panels 102. From there the heated water passes along the path of the arrows to the conduit 18, to supply port 22, back into tank 104, and then out conduit 108 for use of the heated water in the home, for example.

FIG. 9 illustrates the position of the valve stem 46b in that state of the control means 120 which is effective to drain water from the cylinder 114. Compression springs 112 and 134 move the piston 110 and valve stem 46b to the left, and the solar system is placed in an "off" or "drain down" mode. Water drains from the panels 102 into both ports 28 and 18. The water flowing through the port 28 joins with water from port 18, and the combined flow exits via gap 132 to the drain passage 98, and then out of the drain pipe 76b.

Details respecting the particular control means 120 have been omitted for brevity. Generally, a suitable control means 120 senses when ambient temperatures drop to a point that there is danger of freezing of the water in the solar heating panels 102, and consequent damage to the panels. The temperature sensing portion of the control means 120 is then operative to remove hydraulic pressure from the cylinder 114 so that the piston 110 can move from the position of FIG. 8 to that of FIG. 9.

Should there be an accidental loss of hydraulic pressure, or a failure or electrical power to the control means 120, the system is inherently "fail-safe". That is, in either of these situations the piston 110 is automatically allowed to move to the position of FIG. 9 to drain the panels 102. Resumption of power and hydraulic pressure then causes automatic resumption of the service mode illustrated in FIG. 8.

The embodiment of FIGS. 8 and 9 is not only illustrative of another typical application for the valve of the present invention; but it is also illustrative of how the valve structure can be altered to provide for slidable axial movement of the valve stem, rather than axial, threadable movement.

From the foregoing it will be seen that the valve 10 is capable of easy and inexpensive conversion from certain modes of operation to other modes of operation, particularly by reason of the two-piece construction of the valve stem in combination with proper spacings between various ones of the cooperating valve components.

The valve 10 requires no power source, except in the use of a control like the control means 120 of the embodiment of FIGS. 8 and 9. This elimination of any need for electrical power greatly simplifies the valve design and reduces manufacturing costs.

Various modifications and changes may be made with regard to the foregoing detailed description without departing from the spirit of the invention.

I claim:

1. A spool valve comprising:
    a casing including internally threaded members at opposite extremities of said casing, said casing further including means defining a first chamber having a first port, a second chamber having a second port, a third chamber having a third port, and a fourth chamber having a fourth port, said means further defining a passage between said first and second chambers surrounded by a first valve seat, said means further defining a passage between said second and third chambers surrounded by a a second valve seat, said means further defining a passage between said third and fourth chambers surrounded by a third valve seat in confronting relation to said second valve seat;
    a valve stem supported by said casing for axial movement and comprising a pair of axially aligned stem portions coupled at their adjacent ends for rotation in common and axial movement relative to each other, said stem portions being threadably supported by said threaded members, respectively; and
    first and second valve heads mounted to and movable with said valve stem toward a first position in which one face of said first valve head is unseated from said first valve seat, and opposite faces of said second valve head are seated upon second valve seat and unseated from said third valve seat, respectively, to direct fluid from said second port to said first port, and from said fourth port to said third port, said first and second valve heads being movable with said valve stem toward a second position in which said one face of said first valve head is seated upon said first valve seat, and said opposite faces of said second valve head are unseated from said second valve seat and seated upon said third valve seat; and
    valve stem actuation means operable to axially move said valve stem, said stem portions being rotatably and axially movable upon operation of said valve stem actuation means.

2. A spool valve according to claim 1 wherein said valve stem is axially slidably carried by said casing, and said valve stem actuation means comprises bias means operable upon said valve stem to bias said valve stem in one direction.

3. A spool valve according to claim 2 whererin said bias means comprises a pair of compression springs operative, respectively, upon said pair of stem portions.

4. A spool valve according to claim 2 and incuding pressurizable means operable upon said valve stem to bias said valve stem in a direction opposite said one direction.

5. A spool valve according to claim 1 wherein the threads of said threaded members are of equal pitch.

6. A spool valve according to claim 1 wherein the threads of said threaded members are of unequal pitch whereby said valve heads are axially movable different distances for each revolution of said valve stem.

7. A spool valve according to claim 1 wherein said first valve head and said first valve seat include complemental, confronting annular portions which axially project toward one another, are engageable in sealing relation in said intermediate position, and slide over one another in sealing relation during movement of said valve stem from said intermediate position to said second position.

8. A spool valve according to claim 1 and including stop means carried by said valve stem for engagement with said casing upon movement of said second valve head toward said first position, and into predetermined spaced relation with said second valve seat, to define a bleed passage, said stop means being adjustably movable to effect said engagement of said stop means at different predetermined spaced relations of said second valve head and said second valve seat thereby to vary the size of said bleed passage whereby said second valve head is constrained against seating against said second valve seat and a predetermined portion of said fluid is directed from said second port through said bleed passage to said third port.

9. A spool valve according to claim 1 and including stop means carried by said valve stem for engagement with said casing upon movement of said second valve head toward said first position, said stop means being adjustably movable to effect said engagement of said stop means at different predetermined spaced relations of said second valve head and said second valve seat thereby to direct a predetermined portion of said fluid from said second port through said third port in said first position.

10. A spool valve comprising:
    a casing including means defining a first chamber having a first port, a second chamber having a second port, a third chamber having a third port, and a fourth chamber having a fourth port, said means further defining a passage between second and third chambers surrounded by a second valve seat, said means further defining a passage between said third and fourth chambers surrounded by a third valve seat in confronting relation to said second valve seat, said casing including internally threaded members at opposite extremities;
    a valve stem including end connected stem portions threadably supported by said threaded members, respectively, and rotatable to move said valve stem longitudinally, said stem portions being axially movably relative to one another; and first and second valve heads mounted to and movable with said valve stem toward a first position in which said first valve head is unseated from said first valve seat, and opposite faces of second valve head are seated upon said second valve seat and unseated from said third valve seat, respectively, to direct fluid from said second port to said first port, and from said fourth port to said third port, said stem portions of said valve stem being threadedly axially positioned in said threaded members, respectively, whereby said first and second valve heads are movable with said valve stem to a second position in which said first valve seats upon said first valve seat, and said opposite faces of said second valve head are unseated from said second valve seat and seated upon said third valve seat, respectively, to direct fluid from said second port and through said second valve seat to said third port.

11. A spool valve according to claim 10 wherein said threaded member adjacent said first chamber includes drain passage means, and including an end cap mounted to the end of said casing adjacent said first chamber and sealing off said drain passage means.

12. A spool valve according to claim 10 wherein the faces of said first and second valve heads engageable with said first and second valve seats are defined by gaskets, respectively, rotatably carried by said stem portions, respectively.

13. A spool valve according to claim 10 wherein said first and second valve heads are formed as an integral part of said valve stem.

14. A spool valve according to claim 10 wherein the faces of said first and second valve heads engageable with said first and second valve seats are defined by resilient gaskets, and the opposite faces of said first and second valve heads are rigid material; wherein said third valve seat is made of resilient material; a fourth valve seat of resilient material opposite said first valve seat for engagement by said rigid material of said first valve head.

15. A spool valve according to claim 14 wherein said third and fourth valve seats are secured in position between confronting surfaces of said casing and said threaded members, respectively.

16. A spool valve according to claim 14 wherein said third seat is mounted upon one of said threaded members, and said one of said threaded members comprises a cage defining said fourth chamber.

17. A spool valve according to claim 10 wherein one of said threaded members comprises a cage defining said fourth chamber.

18. A spool valve according to claim 10 including resilient means adjacent the interior of said casing and also adjacent said threaded members, respectively; and further including end caps urgeable against said threaded members, respectively, to compress said resilient means against said casing and said threaded members to constrain said threaded members against rotation upon rotation of said valve stem, said threaded members being freely rotatable in said casing in the absence of said constraint.

19. A spool valve according to claim 10 an end cap threadably mounted to said casing for engagement with one of said threaded members for sealing one end of said casing and including a bore axially receiving one end of said valve stem, said end cap including a first counterbore, a larger second counterbore, and a still larger third counterbore; a first annular seal in said first counterbore; an annular spacer washer in said second counterbore adjacent said first annular seal; a second annular seal in said second counterbore adjacent said second annular seal; and an annular retainer element in said third counterbore between said second annular seal and said one of said threaded members.

20. A spool valve comprising:
a casing including first and second axially aligned valve seats;
a valve stem including first and second axially aligned stem portions associated at their adjacent ends for axial movement relative to each other;
first and second valve heads mounted to and movable with said first and second stem portions, respectively, toward a first position in which said first valve head is seated upon said first valve seat and said second valve head is spaced from said second valve seat, said second stem portion being further axially movable relative to said first stem portion to seat said second valve head upon said second valve seat; and
a valve stem actuation mean operable to rotate said first and second valve stem portions in common and to axially move said first and second valve stem portions.

21. A spool valve according to claim 20 wherein said casing includes internally threaded members at opposite extremities, and said stem portions are threadably supported by said threaded members, respectively.

22. A spool valve according to claim 21 wherein the threads of said threaded members are of unequal pitch.

23. A spool valve according to claim 20 wherein said valve stem is axially slidably carried by said casing, and said valve stem actuation means comprises bias means operable upon said valve stem to bias said valve stem in one direction.

24. A spool valve according to claim 23 wherein said bias means comprises a pair of compression springs operative, respectively, upon said pair of stem portions.

25. A spool valve according to claim 23 and including pressurizable means operable upon said valve stem to bias said valve stem in a direction opposite said one direction.

26. A spool valve according to claim 20 wherein one of said adjacent ends of said stem portions fits within the other in said first position; and said adjacent ends are spaced apart in said second position for uncovering a fluid passage in one of said adjacent ends.

27. A spool valve according to claim 26 wherein said casing includes an end cap closure, and said stop means comprises an adjustment screw axially threadably mounted to one extremity of said valve stem for engagement of said screw with an inner surface of said end cap closure upon attainment of said predetermined spaced relation between said second valve head and said second valve seat.

28. A spool valve comprising:
a casing including means defining a first chamber having a first port, a second chamber having a second port, a third chamber having a third port, and a fourth chamber having a fourth port, said means further defining a passage between said first and second chambers surrounded by a first valve seat, said means further defining a passage between said second and third chambers surrounded by a second valve seat, said means further defining a passage between said third and fourth chambers surrounded by a third valve seat in confronting relation to said second valve seat, said means further defining a drain passage from said first chamber;

a valve stem supported by said casing for axial movement and comprising a pair of axially aligned stem portions coupled at their adjacent ends for axial movement relative to each other; and first and second valve heads mounted to and movable with said valve stem toward a first position in which one face of said first valve head is unseated from said first valve seat and the opposite face of said first valve head is seated across said drain passage, and opposite faces of said second valve head are seated upon second valve seat and unseated from said third valve seat, respectively, to direct fluid from said second port to said first port, and from said fourth port to said third port, said first and second valve heads being movable with said valve stem toward a second position in which said one face of said first valve head is seated upon said first valve seat, and said opposite faces of said second valve head are unseated from said second valve seat and seated upon said third valve seat, said first and second valve heads being movable with said valve stem toward an intermediate position in which the opposite faces of said first valve head are unseated from across said drain passage and seated upon said first valve seat, respectively, and said opposite faces of said second valve head are unseated from said second valve seat and unseated from said third seat, respectively, to direct fluid from said second port, through said second chamber, through said third chamber, past the unseated said second valve head to said fourth port, and open a passage for fluid from said first port through said drain passage, said first and second valve heads being movable with said valve stem beyond said intermediate position to said second position; and valve stem actuation means operable to axially move said valve stem.

29. A spool valve according to claim 28 wherein in said second position, one of said faces of said first valve seat is unseated from said drain passage and the opposite face remains seated upon said first valve seat, and said opposite faces of said second valve head are unseated from said second valve seat and seated upon said third valve seat, respectively, to direct fluid from said second port and through said second valve seat to said third port.

30. A spool valve according to claim 28 wherein that face of said first valve head engageable with said first valve seat includes a resilient member progressively compressible upon movement of said valve stem from said intermediate position to said bypass position.

* * * * *